Figures 1, 2:
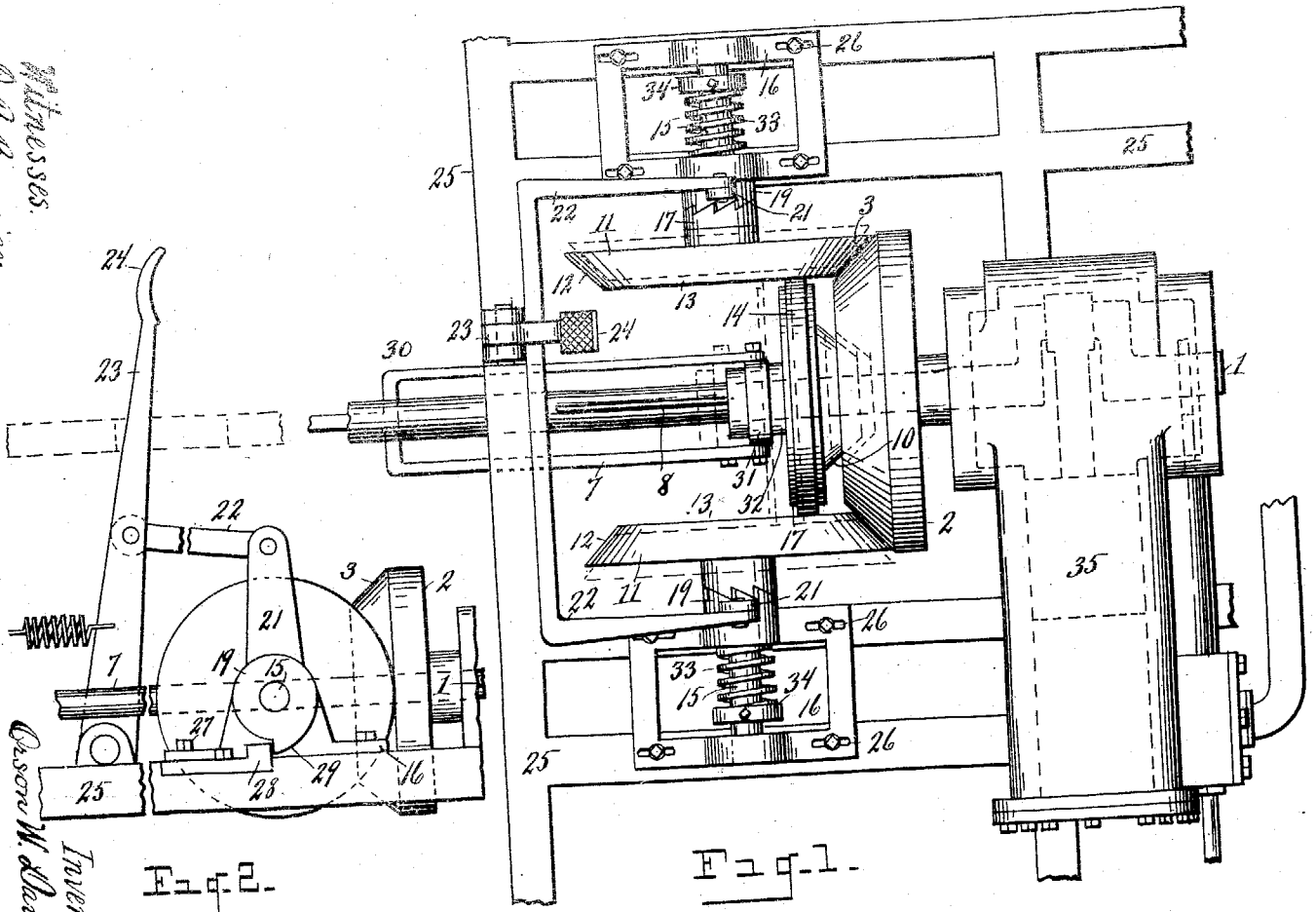

No. 12,544.

REISSUED OCT. 23, 1906.

O. W. DAVIS.

TRANSMISSION GEAR.

APPLICATION FILED MAR. 19, 1906.

2 SHEETS—SHEET 1.

Witnesses.
O. B. Baenziger.
J. G. Howlett.

Inventor
Orson W. Davis.
By E. S. Wheeler & Co. attys.

No. 12,544. REISSUED OCT. 23, 1906.
O. W. DAVIS.
TRANSMISSION GEAR.
APPLICATION FILED MAR. 19, 1906.
2 SHEETS—SHEET 2.
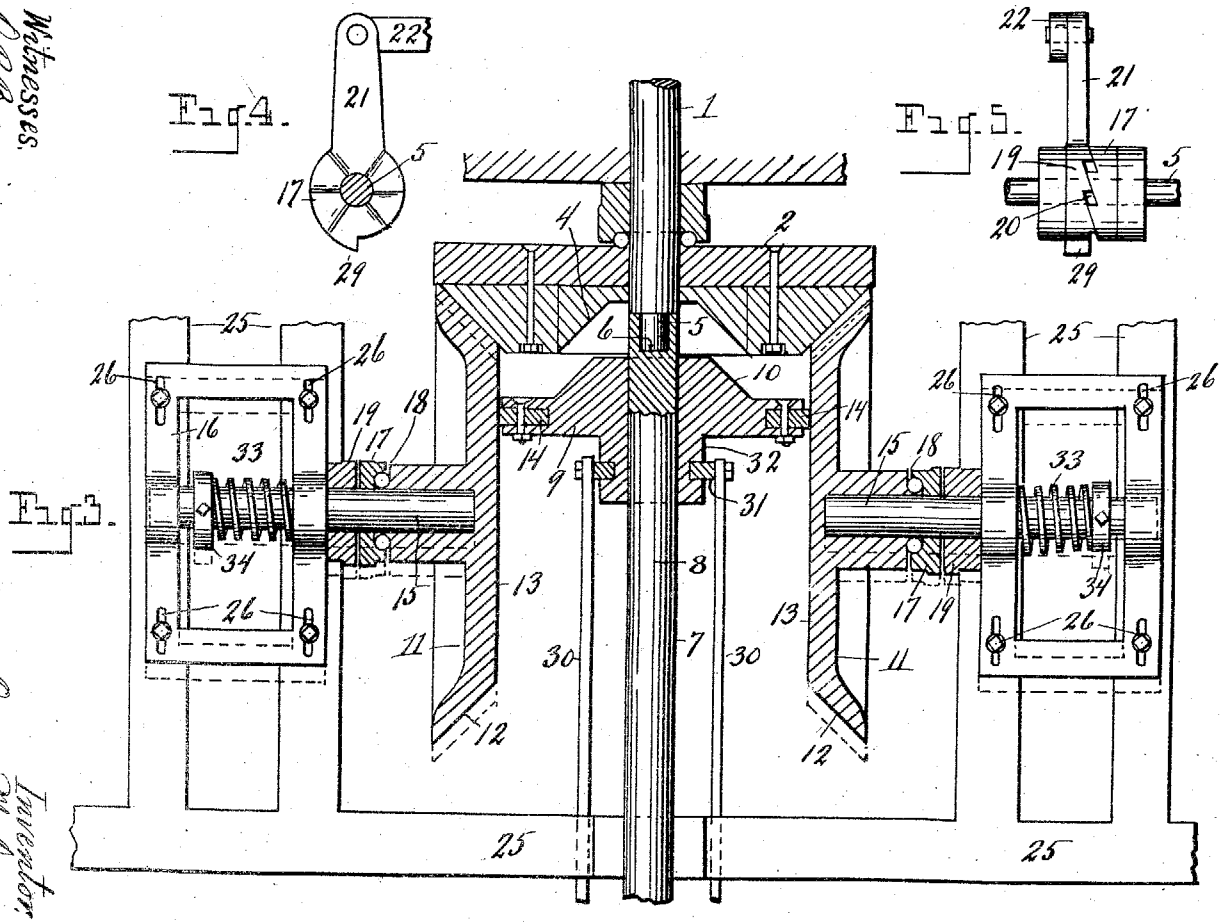
Witnesses.
O. B. Baenziger
J. G. Howlett
Inventor.
Orson W. Davis.
By E. W. Keeler & Co. Attys.

UNITED STATES PATENT OFFICE.

ORSON W. DAVIS, OF ROCHESTER, NEW YORK, ASSIGNOR TO GEARLESS TRANSMISSION COMPANY, OF GLENS FALLS, NEW YORK, A CORPORATION OF MAINE.

TRANSMISSION-GEAR.

No. 12,544. Specification of Reissued Letters Patent. Reissued Oct. 23, 1906.

Original No. 799,148, dated September 12, 1905. Application for reissue filed March 19, 1906. Serial No. 306,932.

*To all whom it may concern:*

Be it known that I, ORSON W. DAVIS, a citizen of the United States, residing at Rochester, county of Monroe, and State of New York, have invented certain new and useful Improvements in Transmission-Gear; and I hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a transmission-gear for motor-vehicles; and it consists in the construction and arrangement of parts hereinafter fully set forth, and pointed out particularly in the claims.

The object of the invention is to provide a frictional transmission-gear which enables the motor or engine shaft to be connected directly or indirectly with the axle of the vehicle, which affords a differential speed, which allows the motion of the vehicle to be reversed, and affords differential speed in the reversed position.

The above object is attained by the mechanism illustrated in the accompanying drawings, in which—

Figure 1 is a plan view showing the application of my invention. Fig. 2 is a side elevation of the mechanism for shifting the friction-disks. Fig. 3 is a plan view, partly in horizontal section. Fig. 4 is an elevation of the face of one of the members of the extension-collars which are employed to move the friction-disks laterally. Fig. 5 is a side elevation of the extension-collar.

Referring to the characters of reference, 1 designates the motor-shaft, upon which is mounted the balance or fly wheel 2. This wheel is provided upon its face with an outwardly-beveled friction-surface 3 and an inwardly-beveled friction-surface 4. The motor-shaft passes through the balance-wheel and has a reduced end or tenon 5, which enters and turns in a socket 6 in the end of the main shaft 7. The main shaft is provided with a key-seat 8, and splined upon said shaft by means of a key in said seat is a friction-wheel 9, having a beveled face 10, adapted to engage the beveled face 4 of the fly-wheel to cause the shaft 7 to be driven directly from the motor-shaft 1.

To provide for indirectly driving the shaft 7 at different speeds and reversing the motion thereof, there are employed opposed friction-disks 11, each having a beveled outer face 12, adapted to run in frictional contact with the beveled face 3 of the balance-wheel, and having a straight friction-face 13, adapted to run in frictional contact with the periphery 14 of the friction-wheel 9, which periphery is composed of suitable friction material. These disks 11 are mounted upon the shafts 15, which run in suitable bearings on the frames 16, in which said shafts are longitudinally movable. The disks 11 are moved toward and from each other by means of the expansion-collars on said shafts, the member 17 of which is provided with a ball-bearing 18 between its face and the hub of the disk to receive the thrust as the collar is expanded and the disk brought into frictional contact with the fricton-wheel 9 or the friction-face of the balance-wheel 2. The part 19 of the friction-collar is provided with the inclined faces 20, which fit into the corresponding inclines on the part 17, so that by partially rotating the part 19 said parts are separated to move the shaft 15 longitudinally and present it to the disk 13, as will be well understood.

To provide for rotating the part 19 of the expansion-collars, said part is provided with the projecting bracket 21, (see Fig. 2,) to which is attached one end of a connecting-rod 22, the other end of which is pivoted to the lever 23, the free end of which carries the foot-pedal 24. By forcing said lever forward the bracket 21 is actuated to partially rotate the member 19 of the expansion-collar, whereby the parts of said collar are separated, as before stated, and the disk 11 projected. There will be one of the levers 23 for each of the disks 11, so placed that said disks may be operated in unison to carry them into contact with the friction-wheel 9. For the purpose of projecting the disks forward so as to bring their beveled faces into frictional contact with the beveled face 3 of the balance-wheel 2 the frame 16, carrying the bearings of the shafts of said disks, are made to slide upon the main frame 25 by means of the slotted openings 26 therethrough, through which are passed the bolts 27. The sliding movement of the frames 16 is accomplished through the medium of the adjustable lug 28 on the main frame, which is adapted to be engaged by the projecting ear 29 on the member 19 of the expansion-collars, the operation being as follows: The first forward movement of the lever 23 will rotate the members 19 of the expansion-collars sufficiently to project the disks 11 into contact with the periphery of the friction-wheel 9, when a further movement of said lever will cause the ears 29 to engage the lugs 28, arresting the rotary movement of the members 19 of the collars and causing a further pressure upon the levers 23 to move the frames 16, thereby sliding the disks 11 into contact with the beveled face of the balance-wheel 2, causing the disks 11 to revolve in opposite directions and driving the friction-wheel 9 and causing a rotation of the shaft 7. To vary the speed of shaft 7, the wheel 9 is moved upon said shaft through the medium of the pull-rods 30, which are connected to a ring 31, lying in an annular channel in the hub 32 of the wheel 9, whereby said wheel may be moved upon the shaft 7 across the face of the disk 11. It will be obvious when said wheel 9 is at the center of the disks 11 no movement will be imparted thereto through said disks, but as it is moved outwardly from the center in either direction the speed at which said wheel is rotated will be gradually increased and that the direction of rotation will be reversed as said wheel is moved from one side of the center of said disks to the other. By this arrangement the vehicle may be driven at any rate of speed either backward or forward, and when desired the disks 11 may be released and shaft 7 driven directly by moving the wheel 9 forward, so as to cause its beveled face 10 to engage the corresponding beveled face 4 of balance-wheel 2, whereby the motor-shaft 1 and the shaft 7 become directly coupled through the balance-wheel.

To retract the friction-disks 11, there is employed upon the shaft of each a coiled spring 33, which bears against the frame at one end and at the other end is confined by a collar 34 on said shaft. The springs are compressed when the disks are projected, and the tension thereof serves to retract the disks when the expansion-collars are released.

In Fig. 1, 35 designates a gasolene-engine of the ordinary type connected to the shaft 1.

Having thus fully set forth my invention, what I claim as new, and desire to secure by Letters Patent, is—

1. In a transmission-gear, the combination of the motor-shaft, a wheel fixed thereon provided with a friction-face, the main shaft rotatable independently of the motor-shaft, a clutch device for connecting said shafts directly, a friction-wheel splined on the main shaft, a transmitting friction-disk having two friction-faces, said disk being movable to cause its friction-faces to engage the friction-wheel on the motor-shaft and the friction-wheel on the main shaft.

2. In a transmission-gear, the combination of the motor-driven shaft, a wheel upon the motor-shaft, the main shaft connected to but rotatable independently of the motor-shaft, a friction-wheel splined on the main shaft, means for connecting the motor and main shafts to cause them to turn in unison, a movable friction-disk located at right angles to the friction-wheel on the main shaft, means for moving said wheel into engagement with the wheel on the motor-shaft and into engagement with the friction-wheel on the main shaft, whereby the main shaft may be driven directly at a fixed speed and indirectly at a variable speed.

3. In a transmission-gear, the combination of the motor-driven shaft, a wheel fixed thereon, a main shaft rotatable independently of the motor-shaft, a movable friction-wheel splined to the main shaft and adapted to engage the wheel on the motor-shaft to establish a direct communication between said shafts, the wheel on the motor-shaft having an outwardly-beveled friction-face, opposed movable friction-disks each having a beveled face adapted to engage the beveled face of the wheel on the motor-shaft and each having a straight face adapted to engage the periphery of the friction-wheel on the main shaft, and means for actuating said disks.

4. In a transmission-gear, the combination of the motor-driven shaft, a friction-wheel thereon, the main shaft rotatable independently of the motor-shaft, a clutch for connecting said shafts to cause them to turn in unison, a friction-wheel splined on the main shaft having a peripheral frictional surface, opposed friction-disks, shafts longitudinally movable in their bearings upon which said disks are mounted, each disk having a friction-surface to engage the friction-face of the wheel on the motor-shaft, expansible collars for projecting said disks to carry their straight faces into contact with the periphery of the wheel on the main shaft, a movable frame carrying the shafts of each of the frictional disks, and means for moving said frames to carry the peripheries of the friction-disks into contact with the friction-face of the wheel on the motor-shaft.

5. In a transmission-gear, the combination of the motor-shaft, the main shaft rotatable independently of the motor-shaft, a friction-wheel on the motor-shaft, a transmitting friction-disk, a driving friction-wheel slidable across the face of said disk, means for transmitting power from the driving friction-wheel to the main shaft, means for connecting said shafts to cause them to turn in unison, said transmitting-disk being movable longitudinally of its axis to contact the driving friction-wheel, and being movable transversely of its axis to contact the friction-wheel on the motor-shaft.

In testimony whereof I sign this specification in the presence of two witnesses.

ORSON W. DAVIS.

In presence of—

G. I. WINSTANDLEY,

IDA GERLING.